(12) United States Patent
Hatuka

(10) Patent No.: US 8,152,023 B2
(45) Date of Patent: Apr. 10, 2012

(54) SYSTEM FOR THE PREPARATION AND DISTRIBUTION OF BEVERAGES IN A TRANSPORTATION UNIT

(76) Inventor: Avishai Hatuka, Tel-Aviv (IL)

( * ) Notice: Subject to any disclaimer, the term of this patent is extended or adjusted under 35 U.S.C. 154(b) by 353 days.

(21) Appl. No.: 12/514,350

(22) PCT Filed: Dec. 18, 2007

(86) PCT No.: PCT/IL2007/001560
§ 371 (c)(1),
(2), (4) Date: May 11, 2009

(87) PCT Pub. No.: WO2008/075346
PCT Pub. Date: Jun. 26, 2008

(65) Prior Publication Data
US 2010/0049362 A1  Feb. 25, 2010

Related U.S. Application Data

(60) Provisional application No. 60/875,368, filed on Dec. 18, 2006.

(51) Int. Cl.
*A47F 1/00* (2006.01)
(52) U.S. Cl. .................. 221/96; 222/146.1; 222/146.6; 222/626
(58) Field of Classification Search .............. 221/96; 222/146.1, 146.6, 626, 54
See application file for complete search history.

(56) References Cited

U.S. PATENT DOCUMENTS

| 3,498,076 | A |   | 3/1970  | Charles |
|-----------|---|---|---------|---------|
| 3,558,013 | A |   | 1/1971  | Ponzo |
| 3,995,713 | A | * | 12/1976 | Hearn ............... 181/119 |
| 4,027,783 | A | * | 6/1977  | Branch et al. ........... 222/26 |
| 4,055,279 | A | * | 10/1977 | Lapera et al. ........... 222/54 |
| 4,140,150 | A | * | 2/1979  | Rundell ............... 137/340 |
| 5,123,335 | A | * | 6/1992  | Aselu ................. 99/295 |
| 5,497,918 | A |   | 3/1996  | Brilanchik |
| 6,076,706 | A |   | 6/2000  | Kritchman |
| 7,203,505 | B1| * | 4/2007  | Larikka et al. ........... 705/51 |
| 2005/0173171 | A1 |  | 8/2005 | Daniels |

FOREIGN PATENT DOCUMENTS

| DE | 2524104 A1 | 12/1976 |
|----|-----------|---------|
| EP | 1277428 A1 | 1/2003 |
| FR | 2595678 A1 | 9/1987 |
| GB | 1495477 A | 12/1977 |

OTHER PUBLICATIONS

International Search Report mailed Jul. 7, 2008 for PCT/IL2007/001560.
Written Opinion of the International Searching Authority mailed Jul. 7, 2008 for PCT/IL2007/001560.

* cited by examiner

*Primary Examiner* — Timothy Waggoner
(74) *Attorney, Agent, or Firm* — The Law Office of Michael E. Kondoudis

(57) ABSTRACT

The present invention relates to a modular beverage system incorporable into a transportation unit. The system comprises a power source, at least one user point, at least one vessel, at least one liquid transferring apparatus operatively associated with said power source; and piping. The vessel is adapted to store therein liquid. Activation the liquid transferring apparatus causes the distribution of at least some of the liquid from the vessel to respective user points via said piping.

17 Claims, 10 Drawing Sheets

SYSTEM FOR THE PREPARATION AND DISTRIBUTION OF BEVERAGES IN A TRANSPORTATION UNIT

CROSS-REFERENCE TO RELATED APPLICATIONS

This application is a National Stage of International Application No. PCT/IL2007/001560 filed Dec. 18, 2007, which claims priority based on U.S. Provisional Patent Application No. 60/875,368 filed on Dec. 18, 2006, the contents of both of which is incorporated by reference herein.

FIELD OF THE INVENTION

The present invention relates to the field of beverages systems. More particularly, the present invention relates to a beverage system embedded in a transportation unit.

BACKGROUND OF THE INVENTION

Storage space in a transportation unit's passenger area is usually very limited. Accordingly, large amounts of beverages are usually stored in the trunk of the transportation unit. Therefore, the transportation unit must first be stopped in order to provide a passenger access to the beverages. Furthermore, the preparation of hot beverages in a transportation unit is limited for safety and comfort reasons.

A U.S. Pat. No. 5,497,918 by Brilanchik Menachem, discloses a system in a land transportation unit for the delivery of a hot or cold drink. The system includes at least one closed loop for heating or cooling with a circulating heat carrier fluid, and at least one open loop in which a drink is conducted from a reservoir to a dispenser via an indirect heat exchanger that forms part of the closed loop. In one embodiment the system delivers by choice either a hot or a cold drink and it includes two open loops and two closed loops.

A patent application number US2005173171 by Daniels Jerome, discloses a transportation unit liquid dispensing system having a dispenser, which may be retracted or concealed within the dashboard, a thermoelectric liquid heat exchanger for heating or cooling the liquids, an esthetically pleasing liquid reservoir and a pump: all components are disposed within the structure of the transportation unit and do not take up passenger compartment space. In embodiments, an on/off switch may be provided to prevent dispensing, a switch may be provided at the dispenser to activate the pump, the pump may be electrical, and the fluid connections between the components of the system may be provided with connectors allowing easy cleaning.

A U.S. Pat. No. 6,076,706 by Kritchman Jerold, discloses a chilled water dispenser for use in motor transportation units having a conventional air conditioning systems. The chilled water dispenser employs a bottled water holder that is secured in the trunk of an automobile. A transfer pump draws fluid from the bottle to a heat exchanger placed within the engine compartment of the motor transportation unit. The heat exchanger is coupled to a conventional air conditioning system and has a thermostatically controlled solenoid to moderate reservoir temperatures. Upon demand the dispenser provides chilled water through a spigot mounted within the seating area of the motor transportation unit. The heat exchanger is pre-charged with a refrigerant, allowing for ease of installation and includes fittings that allow the air conditioning system to be serviced in its ordinary manner.

SUMMARY OF THE INVENTION

The present invention discloses a beverage system and method adapted for a transportation unit (e.g. a vehicle, an airplane, a train, a ship etc.), where the system may comprise at least one preparation unit enabling to prepare at least one type of beverage; at least one distribution unit enabling a passenger in said transportation unit to input a desirable beverage and to serve said beverage prepared and arriving from said preparation unit, wherein said distribution unit is connected to said preparation unit via piping; and a controller operatively connected to said at least one distribution unit and to said preparation unit.

According to some embodiments of the invention, the preparation unit may be seated at the trunk of the transportation unit and the distribution unit or units may be seated at the passengers area of the transportation unit, where the prepared beverage may be moved by the system's piping arriving from the preparation unit to the distribution unit.

According to some embodiments of the invention, the system may be pneumatic enable sealing external air from reaching the piping. According to these embodiments, the preparation unit may comprise:

a water container;
at least one compressor enabling to compress air and push said air through air piping connected to said water container through a piping, faucets and valves enabling to close and open the compressed air enabling to take out water from said water container;
at least one dispenser enabling to dispense soluble edible materials into a piping that leads to said distribution unit.

According to these embodiments of the invention, the distribution unit may comprise:

a control panel enabling a user to select beverages, beverages additions, pay for a selected beverage, notify the passenger regarding costs and availability of beverages; and
a delivery unit comprising beverage cups, wherein said delivery unit is connected to said preparation unit;

Once the passenger selects a beverage, the preparation unit prepares the selected beverage and delivers said beverage via said piping to the delivery unit where said beverage is poured to a cup from said delivery unit.

According to some embodiments of the invention, the delivery unit may additionally comprise a dispensing cups-container enabling to store a multiplicity of cups and to allow a single cup to reach a pouring zone where it may be filled with the selected beverage; and a moving unit enabling to move the cup from the dispensing cup-container area to an area in which the selected beverage is poured. For example, the moving unit may be a conveyor enabling to convey cups from a pouring area to other areas.

According to some embodiments of the invention, the delivery unit may additionally comprises a dispensing lid-container enabling to hold a multiplicity of lids adapted to be fastened and cover said cups, wherein each lid comprises an opening suitable for receiving of a tube like piping used for inserting the selected beverage into said cup. The moving unit may enable first moving the cup from the dispensing cup-container area to the area in which the cup is added with a lid and then move the covered cup to the pouring area where the tip of the piping may be threaded through the opening of the lid to insert the selected beverage.

According to some embodiments of the invention, the preparation unit may additionally comprise:

a boiling container connected to said water container, wherein said hot beverage container comprises a heating element enabling to heat water in said boiling container wherein said water arrive from said water container;
a mixing chamber connected to said boiling container;
at least one dispenser comprising soluble materials for preparing of at least one type of a hot beverage comprising a conveyor for pouring said soluble materials into said mixing chamber;

wherein said mixing chamber allows the heated water to mix with the dispensed soluble materials in said chamber to prepare said hot beverage.

According to some embodiments of the invention, the water container may also comprise a heating element and a thermometer, where the heating element of said water container may enable heating of the water contained in said water container to a predefined temperature.

According to some embodiments of the invention, the mixing chamber may comprise distribution openings enabling spraying the soluble materials arriving from said dispenser into said chamber while said heated water are poured from the boiling container into said chamber whereby the soluble materials are stirred with said heated water.

According to some embodiments of the invention, the system additionally comprises an espresso mechanism enabling to prepare espresso beverages, which may be connected to the preparation unit. The espresso mechanism may comprise: a capsules container enabling to contain espresso capsules; capsules tube enabling to direct a new capsule to the bottom part of said tube; a capsule-holder installed at the bottom of said tube enabling to hold the espresso capsule; and a pressure pump enabling to introduce a steam of water, arriving from the boiling container, to the capsule-holder where the steaming water are filtered by the espresso extract from said new capsule enabling to output a liquid of espresso.

According to some embodiments of the invention, the espresso mechanism may further comprise a removable capsules-waste bin enabling containing of used espresso capsules.

According to some embodiments of the invention, the control panel may comprises:
 a display unit enabling to display messages relating to prices and availability of beverages;
 cold beverages options allowing a passenger to view all available cold beverages and select a desirable cold beverage;
 hot beverages options allowing a passenger to view all available hot beverages and select a desirable hot beverage;
 additions options enabling a passenger to select and view additions to the selected beverage;
 a payment unit enabling a passenger to pay for the selected beverage according to predefined corresponding prices and payment options.

According to some embodiments of the invention, the system may additionally comprise a packed beverages container seated at the trunk of the transportation unit containing packed beverages; a conveyor comprising a lifting apparatus that enables lifting the packed beverages upon holders attached to said conveyor, wherein said holders enable to hold said packed beverages while lifted to the distribution unit seated at the passengers area. The packed beverages container may be integrated with a refrigerating mechanism allowing cooling of the beverages stored at said packed beverages container.

According to some embodiments of the invention, a multiplicity of distribution units may be connected to a single preparation unit enabling to supply beverages to said multiplicity of said distribution units.

According to some embodiments of the invention, at least one of the distribution units connected to said at least one preparation unit may comprise a thermal cup mechanism. The thermal cup mechanism may comprise a cup and a body, where said body may connect to an edge of the piping of the system at one end that enables pouring the selected beverage into said cup. The cup and body may be removably fastened through a fastening mechanism enabling to hermetically fasten the body to the cup's lid.

According to some embodiments of the invention, the engine of the transportation unit is the power source of the system enabling to use the power of the engine, when started, to electronically operate said system.

According to some embodiments of the invention, the water container may comprise a timer operatively associated with the dispenser's faucet enabling to open and close said faucet according to predefined time-intervals thereby defining the amount of water and soluble materials released to prepare said beverage.

BRIEF DESCRIPTION OF THE DRAWINGS

The subject matter regarded as the invention will become more clearly understood in light of the ensuing description of embodiments thereof, given by way of example only, with reference to the accompanying drawings, wherein FIG. 1 schematically illustrates a transportation unit and some of the piping layout of a beverage distribution system incorporated in said transportation unit, according to some embodiments of the invention.

Figure 1A:
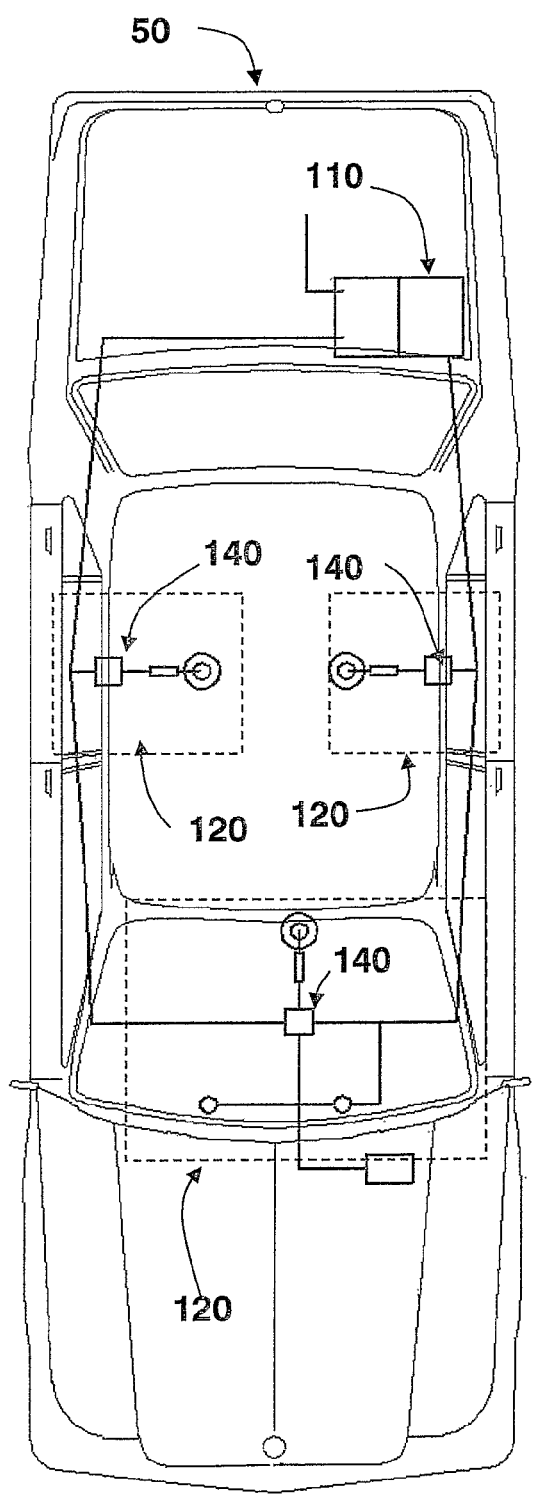

The drawings taken with description make apparent to those skilled in the art how the invention may be embodied in practice. It should be understood that no attempt is made to show structural details of the invention in more detail than is necessary for a fundamental understanding of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

An embodiment is an example or implementation of the inventions. The various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment.

DESCRIPTION OF SOME EMBODIMENTS OF THE INVENTION

The present invention relates to a beverages system 100, which may include a liquid transferring apparatus that enables the preparation and the distribution of beverages within a transportation unit 50 (e.g. a bus, a train, a car, a n airplane etc.). The system 100 may be adapted to receive from a passenger via a suitable control panel 140, which has an input and output device. The control panel may be located inside the passenger's 900 area of the transportation unit and is adapted to receive an input, which may represent a request for providing a certain beverage to respective passengers. Input device may be, for example, a keyboard, a voice recognition module, a tracking device or any other suitable input device, e.g., as known in the art.

Upon receiving the request, the system 100 may first prepare the beverage, and only then distribute said beverage to respective passengers. The system 100 may be modulated to prepare and distribute hot and/or cold beverages such as coffee or tea of predefined types (e.g. espresso, latte etc.) and/or soft drinks and cold water. According to some embodiments, the control panel 140 may be located within the passenger's 900 area of the transportation unit 50.

According to some embodiments of the invention, the operability of the system 100 the power source 145 operating the system 100 may originate from the transportation unit's 50 electricity. This may mean that the unit's 50 engine needs to be started to operate at least some of the system's 100 parts (e.g. the heating elements 22).

An embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions.

It is understood that the phraseology and terminology employed herein is not to be construed as limiting and is for descriptive purpose only.

The principles and uses of the teachings of the present invention may be better understood with reference to the accompanying description, figures and examples.

It is to be understood that the details set forth herein do not construe a limitation to an application of the invention. Furthermore, it is to be understood that the invention can be carried out or practiced in various ways and that the invention can be implemented in embodiments other than the ones outlined in the description below.

It is to be understood that the terms "including", "comprising", "consisting" and grammatical variants thereof do not preclude the addition of one or more components, features, steps, integers or groups thereof and that the terms are not to be construed as specifying components, features, steps or integers.

The phrase "consisting essentially of", and grammatical variants thereof, when used herein is not to be construed as excluding additional components, steps, features, integers or groups thereof but rather that the additional features, integers, steps, components or groups thereof do not materially alter the basic and novel characteristics of the claimed composition, device or method.

If the specification or claims refer to "an additional" element, that does not preclude there being more than one of the additional element.

It is to be understood that where the claims or specification refer to "a" or "an" element, such reference is not to be construed as there being only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" refers to manners, means, techniques and procedures for accomplishing a given task including, but is not limited to those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention can be implemented in the testing or practice with methods and materials equivalent or similar to those described herein.

The terms "bottom", "below", "top" and "above" as used herein do not necessarily indicate that a "bottom" component is below a "top" component, or that a component that is "below" is indeed "below" another component or that a component that is "above" is indeed "above" another component as such directions, components or both may be flipped, rotated, moved in space, placed in a diagonal orientation or position, placed horizontally or vertically, or similarly modified. Accordingly, it will be appreciated that the terms "bottom", "below", "top" and "above" may be used herein for exemplary purposes only, to illustrate the relative positioning or placement of certain components, to indicate a first and a second component or to do both.

Figure 1B:
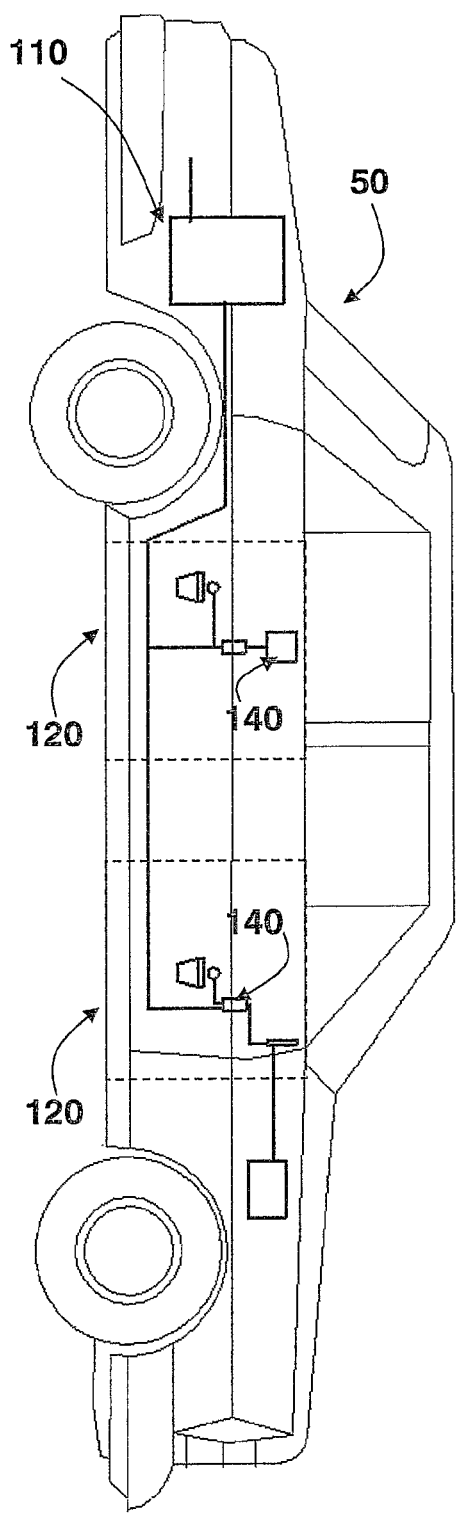
Figure 2:
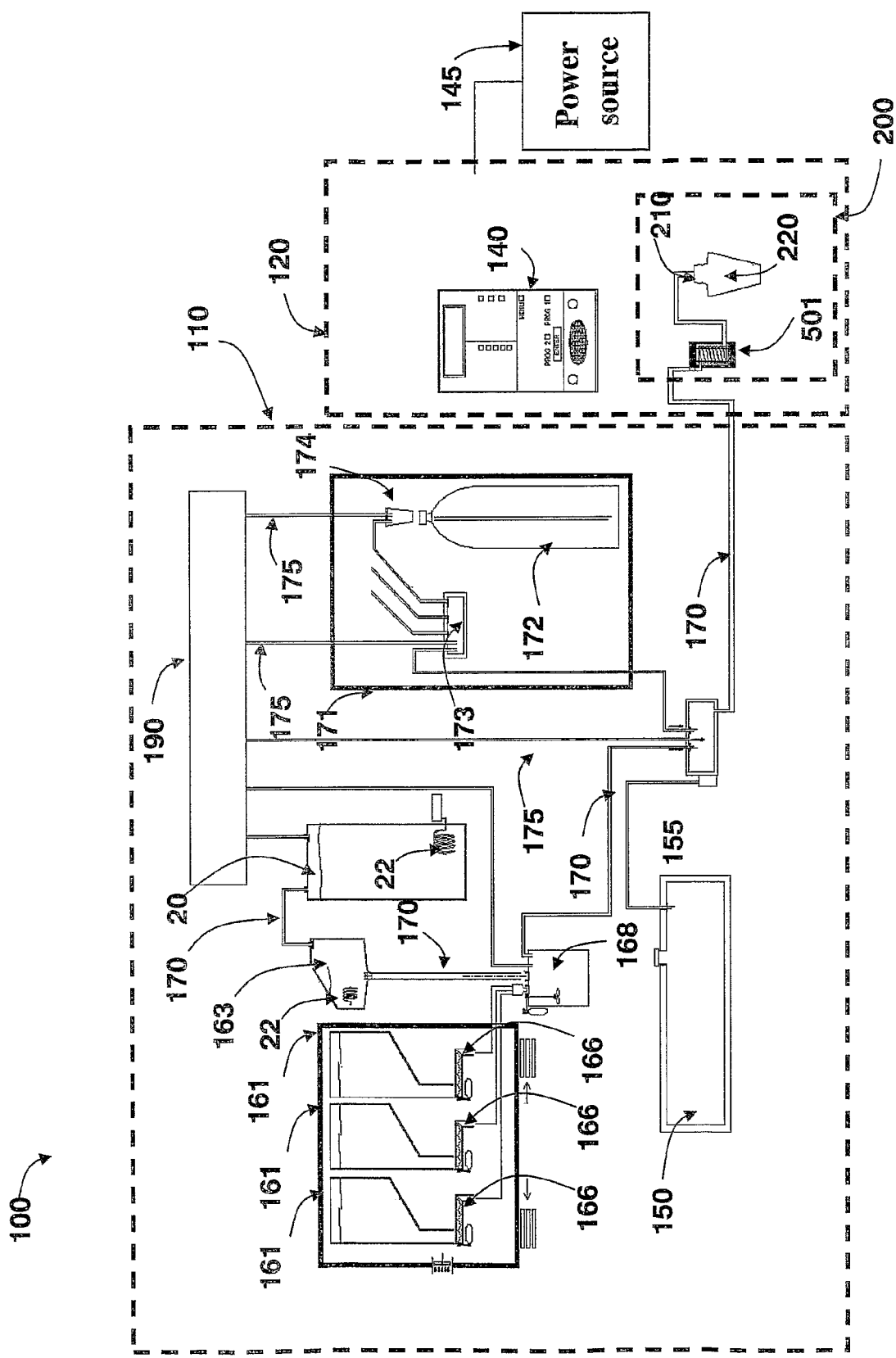
FIG. 2 schematically illustrates the piping layout of the beverage distribution system, according to some embodiments of the invention.

Reference is now made to FIG. 1, which schematically illustrates a top view of a beverage distribution system 100 incorporated in the transportation unit 50, according to some embodiments of the invention; and to FIG. 2, which schematically illustrates the piping layout of beverage distribution system 100, according to some embodiments of the invention.

According to these embodiments, the system 100 may be incorporated in a transportation unit 50. The transportation unit 50 may be any type of transportation unit 50 such as, for example, a train, a bus, a truck, a ship, a ferry, a private car and the like. The system 100 may comprise one or more distribution units 120, as illustrated in FIG. 1.

According to some embodiments of the invention, the system may comprise:

At least one preparation unit 110; and
at least one distribution unit 120, which may be operatively associated with the preparation unit 100; and
a controller 300 enabling to electronically control all the operations of the system 100.

Figure 3:
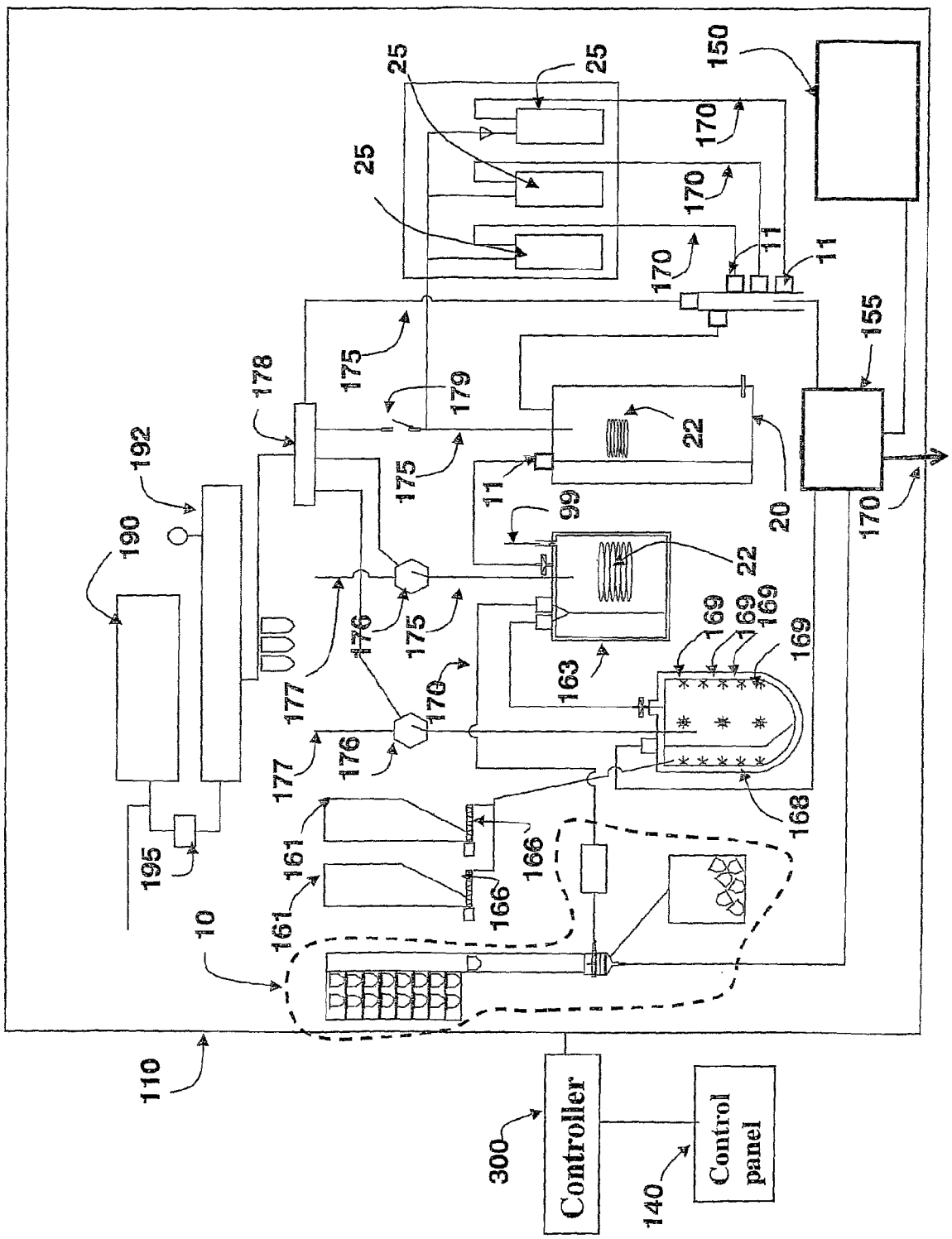
FIG. 3 schematically illustrates the piping layout of the beverage distribution system, according to some embodiments of the invention.

According to some embodiments of the invention, the controller may be operatively associated and connected to the control panel(s) 140, as illustrated in FIG. 3, the distribution unit 120 and to the preparation unit 110 to allow receiving operation commands from the panel 140 and to operate the electronically controlled components of the preparation unit 110 and of the distribution unit 140.

The preparation unit 110 may enable preparing hot beverages, cold beverages or both and channel the prepared beverage to the distribution unit 120. The distribution unit 120 may enable a passenger 900 to select a preferable beverage, pay for the beverage and receive the selected beverage.

According to some embodiments of the invention, the preparation unit 110 may be situated at the trunk of the transportation unit 50 where the distribution unit(s) 120 may be situated at the passengers' 900 area, as illustrated in FIG. 1.

According to some embodiments of the invention, some of the distribution units 120 may be situated in the rear of transportation unit's 50 passenger's 900 area, where a different distribution unit 120 may be situated in the front part of transportation unit's 50 passenger part (e.g. the driver's cabin).

According to some embodiments of the invention, as illustrated in FIG. 2, the distribution unit 120 may comprise:

a control panel 140 enabling the passengers 900 to select a beverage (either hot or cold), select beverage additions (e.g. sugar, milk, froth etc.) and to pay for the beverage;
a serving mechanism 200 comprising serving vessels (e.g. cups 220) and a mechanism that allows directing the beverage liquid into the cup 220;
beverages piping 170 allowing delivering of the prepared beverages from the preparation unit 110 to the distribution unit 120.

According to some embodiments of the invention, the distribution unit 120 may also comprise notification mechanism enabling to notifying the passenger 900 regarding unavailable beverages (e.g., beverages that the system 100 cannot currently provide despite their being listed in the control panel 140) and flaws in the system 100. For example, the system 100 may comprise a screen enabling to display text notifications specifying the problem and/or able to display vocal and/or light notification specifying the problem.

According to some embodiments of the invention, as illustrated in FIG. 2, the preparation unit 110 may comprise:

at least one compressor 190;
at least one power source 145 enabling to operate the system 100;
at least one cooling apparatus 171 (e.g. a refrigerator) comprising at least one cold beverage container 172 containing a cold beverage connected to the air piping 175 that connects to the compressor 190 and to the distribution unit 120;
a main water container 20 that may comprise a heating element 22;
a boiling container 163 that may also comprise a heating element 22;
at least one dispenser 161 enabling to dispense edible soluble materials (e.g. sugar, coffee powder, milk powder etc.); and
at least one mixing chamber 168 connected to the dispenser(s) 161 and to the boiling container 163), where the chamber 168 may comprise a stirring mechanism that enables stirring the hot water with the soluble materials throughout a predefined time interval; and
a waste container 150 allowing waste materials and liquids to be removed from the system 100.

According to some embodiments of the invention, the power source 145 may be external to the system 100 where the system may connect to said power source via a connector. For example, the power source 145 may be the electricity system of the transportation unit 50 where the beverages system 100 may enable connecting to the electricity system through the connector (e.g. through the electric lighter electrical outlet in the transportation unit 50).

Additionally, the connector may be removably adapted to connect to a converter that allows connecting said beverages system 100 to other electric power sources 145 such as, for example, home appliances' electric system.

According to some embodiments of the invention, the system 100 may comprise various timers connected to different faucets 11 enabling compressed air or liquids (water, beverages and the like) to flow and/or delaying the liquid from exiting a container or a chamber 168 according to predefined time intervals.

The power source 145 may be of any suitable type such as, e.g., batteries included the transportation unit's 50 rechargeable batteries, non-rechargeable batteries, solar power, and the like.

According to some embodiments of the invention, the compressor 190 may be any type of compressor, e.g., as known in the art. Alternatively, the compressor 190 may be replaced by a pump such as, for example, a centrifugal pump, a displacement pump or any other suitable pump.

The control panel 140 may be adjusted within the transportation unit 50 such that both passengers 900, which are sitting in the front of transportation unit 50 as well as passengers 900, which are sitting in the back of transportation unit 50 can provide respective control panel 140 with an input/output allowing the passengers 900 to select their preferred beverage out of the optional beverage defined and available in the system 100.

According to some embodiments of the invention, the system 100 may be adapted to securely hold the cold beverages container 172, where the cold beverages container 172 may be adapted to contain liquids such as a soft drink bottle, for example.

According to some embodiments of the invention, the system 100 may additionally comprise a mechanism (not shown) that enables selectably adjusting a plug 174 to respective openings of the cold beverages container 172, or vice versa. Said adjustment may be performed according to the input received at the control panel 140 from one of the passengers 900 in the transportation unit 50.

Reference is now made to FIG. 3, which schematically illustrates a preparation unit 110 adapted for being installed in a transportation unit 50, according to some embodiments of the invention.

According to these embodiments, the system 100 may be pneumatic using air pressure driven by at least one compressor 190 and an air regulator 195. The pneumatic system 100 may facilitate in preventing polluting of the piping 170 and 175 of the system 100

The air compressed by the compressor 190 may move to a pressure container 192 and from there on to the relevant parts through a manifold 178 enabling to divide the air current to a multiplicity of channels. The compressed air may be allowed to move in and out of the air piping 175 using valves 176 and/or faucets 11 that may be electronically controlled enabling to regulate the airflow and pressure according to the system's 100 requirements. The air piping 175 may have opening exits 177 enabling to reduce pressure when pressure exceeds a predefined limit.

According to some embodiments of the invention, the preparation unit 110 may comprise a main water container 20—preparation connected to the manifold 178 through air piping 175 that comprises a manual switch 179 enabling to disconnect the container for refilling or cleaning purposes. The compressed air may be transferred to the rest of the system 100 through filters enabling to clean the air before it reaches the manifold 178.

Additionally, the boiling container 163 may be connected to the main water container 20 through beverages piping 170 to allow filling a predefined amount of water in the boiling container 163 using the heating element 22 and a thermostat. The boiling container 163 as well as the dispensers 161 may be connected to the mixing chamber 168 allowing to pour the water from the boiling container 163 and the soluble materials from the dispensers 161 into the mixing chamber 168 to be further stirred and mixed to create the desirable hot beverage.

Additionally, the water container 20 may also be connected to cold beverages dispensers 25 containing soluble materials for cold or lukewarm water (e.g. sweet concentrated soluble powders and/or liquids). The soluble materials may be pushed or moved from the cold beverages dispensers 25 through the beverages piping 170 all the way until reaching an opening or a beverages manifold 155 that leads to the cup 220 at the distribution unit 120.

According to embodiments of the invention, the cold and hot beverages dispensers 25 and 161 respectively, may be operatively associated with the control panel 140 and the power source 145, where each dispenser 161/25 may be connected to a faucet 11/176 electronically controlled by the panel 140. Once the passenger 900 selects a desirable beverage the system 100 may automatically open and close valves and faucets 11/176 enabling predefined quantities of soluble materials (associated with the selected beverage) to exit their dispensers 25/161 and a predefined quantity and temperature of water to be released and boiled if necessary.

According to some embodiments of the invention, the main water container 20 may additionally comprise a heating element 22 operatively associated with a thermostat and the control panel 140 enabling to carry out a pre-boiling procedure within the main container 20 to facilitate in optimizing time end energy utilization. The first heating of the water (carried out in the main water container 20) may heat the water to a predefined temperature TO where the second heating (carried out in the boiling container 163) may complete the boiling using less energy and/or less time to carry out the boiling process According to some embodiments of the invention, the mixing chamber 168 may comprise distribution openings 169 connected to the beverages piping 170 that carries the soluble materials from the hot beverages dispensers 161. Once a hot beverage is ordered by a passenger 900 using the control panel 140, the soluble materials may be released to the chamber 168 along with the boiled water arriving from the boiling container 163 (which may be determined by the amount of materials, the number of openings 169 and the diameter of the openings 169) may determine the stirring level of the beverage and may be controlled and predefined according to each beverage available at the system's 100 selections options.

According to some embodiments of the invention, some of the liquid stored in the cold beverages container 172 may be advanced through the piping 170 to a vessel 173, as illustrated in FIG. 2, and from there on to a beverages manifold 155. At least some of the liquid contained in the joint vessel 155 may be transferred to the distribution unit 120 that corresponds to the input provided to control panel 140.

According to some embodiments of the invention, the soluble materials in the dispensers 161 and/or 25 may enable dissolving when in contact in hot and/or cold water. The conveyors 166 installed at the exit point of each dispenser 161/25 may facilitate in carrying solid and/or liquid soluble materials to the openings 169 of the mixing chamber 168.

According to some embodiments of the invention, powder dispensers are positioned on shock absorbers such as, e.g., springs.

When the control panel 140 receives a suitable input from one of the passengers 900, the corresponding conveyor 161 may start to convey soluble materials (e.g. powders) to the mixing chamber 168. According to some embodiments of the invention, the input may include an indication regarding the amount of soluble materials to be conveyed from the corresponding dispenser 166 to the mixing chamber 168. The mixing chamber 168 can be provided with hot liquid, as will be outlined hereinafter.

According to some embodiments of the invention, the beverage system 100 may comprise a boiling container 163, which is equipped with a second heating element 22. The outlet of the boiling container 163 may be connected to the inlet of mixing chamber 168 via piping 170. The outlet of the water container 20 may be connected to the inlet of the boiling container 163 via piping 170. The boiling container 163 may include a pressure reducer 99, as illustrated in FIG. 3, such as an opening with a sealing valve, where the valve enables lifting from the opening once the pressure in the boiling container 163 exceeds a threshold limit.

According to some embodiments of the invention, at least some of the liquid stored in the mixing chamber 168 may be transferred to a beverages manifold 155.

Additionally or alternatively, draining of the joint vessel 155 may be accomplished by transferring liquid, which remained in said beverages manifold 155 to a waste container 150. Transferring the liquid from the beverages manifold 155 to the waste container 150 may be accomplished by operating a second compressor 190 or by operating a pump 158. In an embodiment of the invention, as illustrated in FIG. 2, the second compressor 190 may provide the beverages manifold 155 with compressed air via air piping 175.

Figure 4:
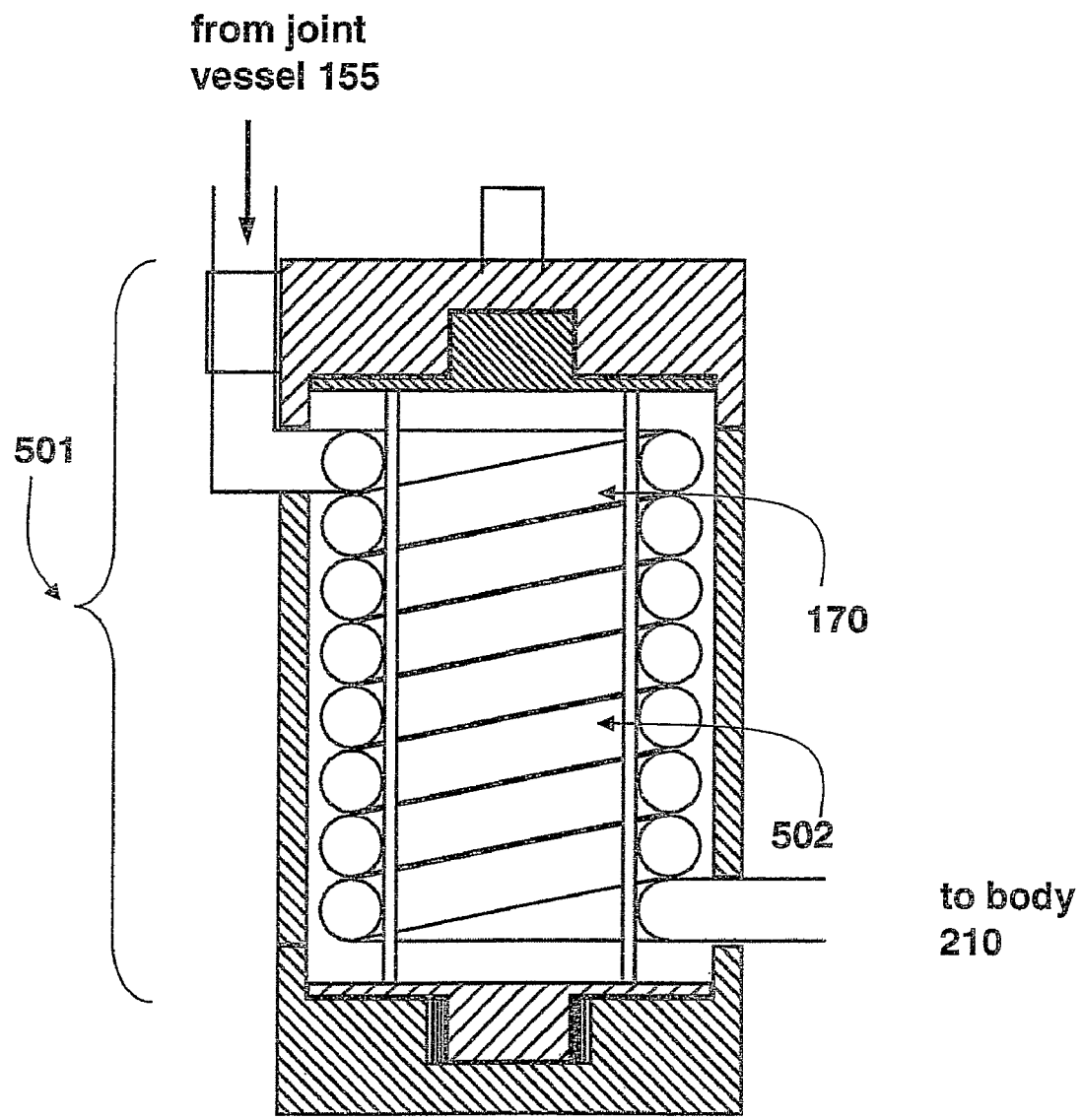
FIG. 4 schematically illustrates a coilable piping section, according to some embodiments of the invention.

Reference is now made to FIG. 4, which schematically illustrates a retractable piping section 501, which may be coilable, according to some embodiments of the invention.

According to these embodiments of the invention, at least a portion of the beverages piping 170 may connect to the retractable piping section 501) where parts of the beverages piping 170 may be coiled around at least one cylinder enabling to accumulate torque to enable retrieving of the piping 170 when necessary. For example, as illustrated in FIG. 2, adjacent to a cup 220 situated at the driver's cabin enabling to connect to a loose portion of the beverages piping 170 end serving as a straw to allow filling of said cup 220.

Figures 5A, 5B:
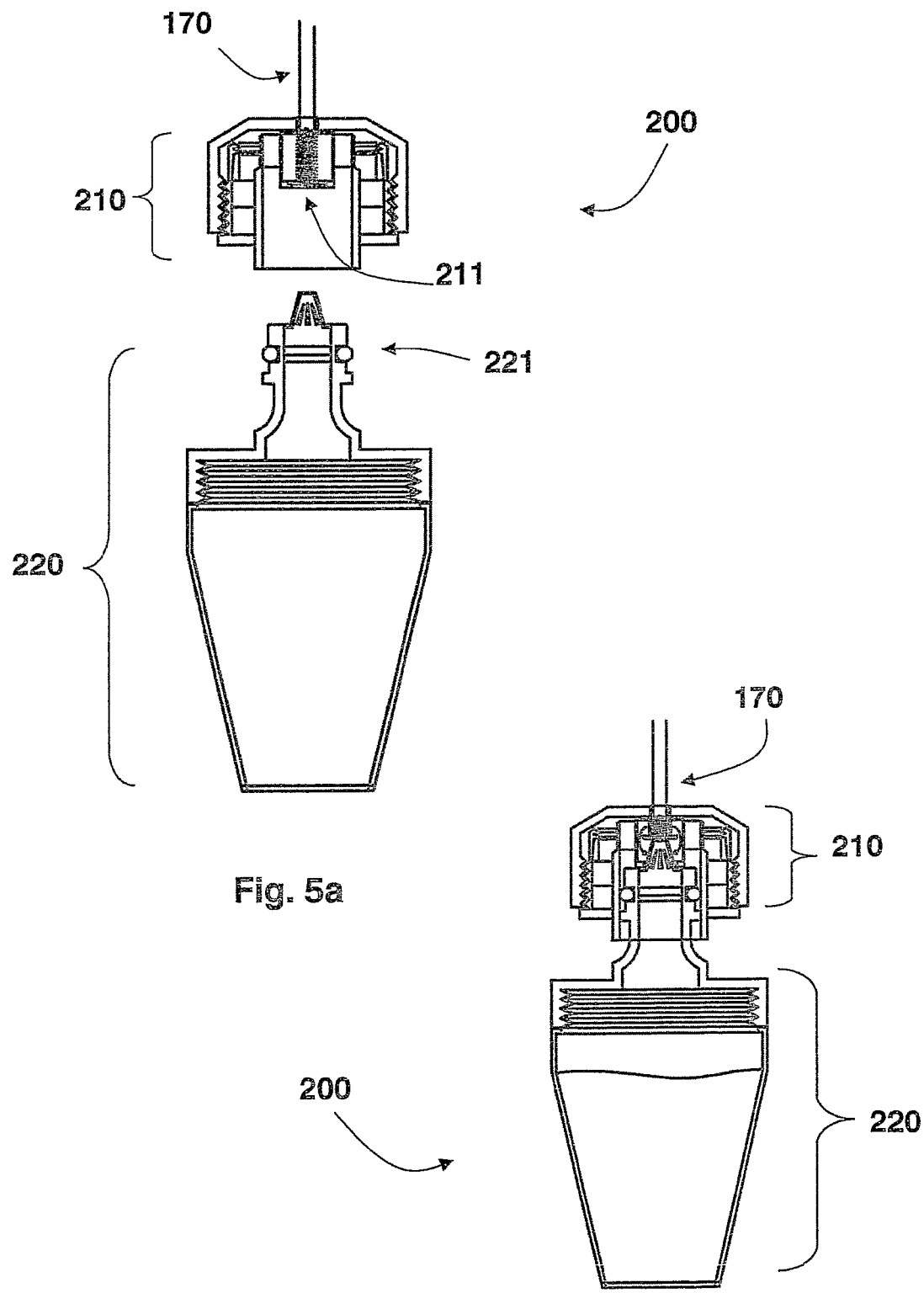
FIG. 5a and FIG. 5b schematically illustrate a thermal cup mechanism in an un-fastened position and in a fastened position respectively, according to some embodiments of the invention.

Reference is now made to FIG. 5*a* and FIG. 5*b*, which schematically illustrate an exploded cross section view of a thermal cup mechanism 200, according to some embodiments of the invention. The cup 220 may comprise a protruding funnel shaped edge 221 and the body 210 may comprise a niche like receiving part 211 connected to the edge of the beverages piping 170, from which the beverage is poured. The thermal cup mechanism 200 may enable pouring of the beverage arriving from said preparation unit 110 through the body's 210 edge 211 and the piping 170 from which the beverage is poured, to the cup 200 through the cups protruding edge 221 only once said body 210 is fastened to said cup 220 and prevents said flow when said body 210 is removed from said cup 220.

According to these embodiments, at least one of the distribution units 120 (e.g. a distribution unit 120 situated at the driver's seat) may be equipped with a thermal cup mechanism 200. The mechanism 200 may comprise a body 210 that may be removably connected to respective piping 170 and a cup 220 that may be detachably connectable to the body 210. The cup 220 may be connected to the body 210 by a fastening mechanism that enables substantially hermetical fastening of the cup 220 to the body 210 and hence to the piping 170 from which the beverage may be poured. The fastening mechanism may be, for example, a screwing mechanism, a click-shut mechanism or by any other suitable mechanism. For example, the body 210 may comprise a spring mechanism, where the cup 220 may be integrated with a tube-like extension that may be sealed when detached from the spring.

According to some embodiments of the invention, body 210 may include a spring-lock mechanism that by default presses against the outlet of said body 210. Accordingly, when cup 220 is detached from body 210, the outlet of body 210 is closed, thereby preventing the flow of fluid through said outlet.

According to some embodiments of the invention, connecting cup 220 to body 210 presses the spring-lock away from the outlet, thereby enabling the flow of fluid through said outlet. Such a spring-lock mechanism prevents uncontrolled flow of fluid into cup 220, thereby increasing safety of beverage system 100.

Figure 6:
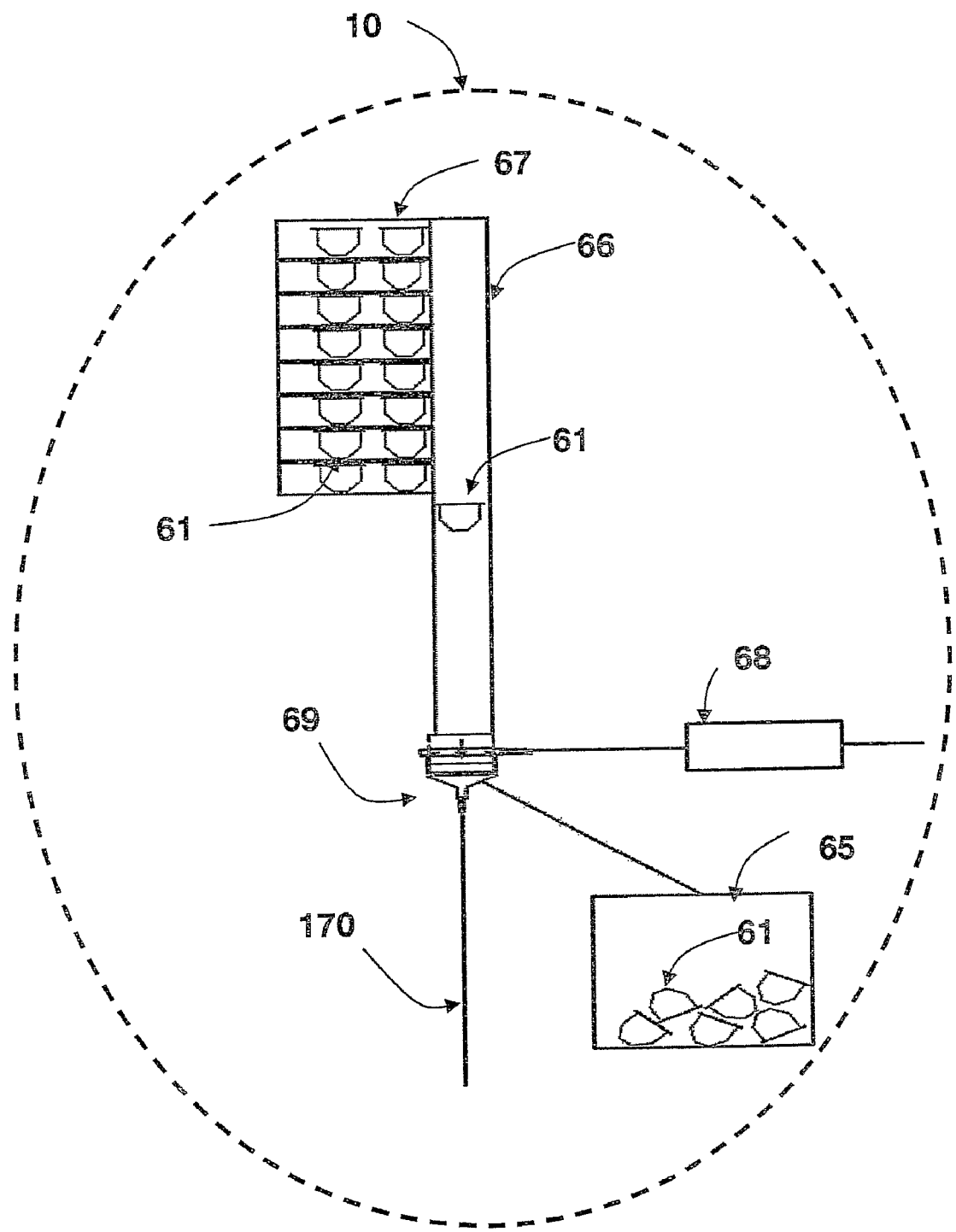
FIG. 6 schematically illustrates an Espresso mechanism, adapted to prepare Espresso and dispose waste in a transportation unit, according to some embodiments of the invention.

Reference is now made to FIG. 6, which schematically illustrate an Espresso mechanism 10 as known in the art, according to some embodiments of the invention.

According to some embodiments of the invention, as illustrated in FIG. 6, the Espresso mechanism 10 may comprise:
- capsules container 67 enabling to contain espresso capsules 61;
- capsules tube 66 enabling a new capsule to drop and reach the bottom part;
- a capsule-holder 69 enabling to hold the espresso capsule 61 as well as to perforate the lid of the capsule 61;
- a pressure pump 68 enabling to introduce a steam of water to the capsule-holder 69 where the steaming water may be filtered by a coffee powder extract in the capsule 61 enabling to output a liquid of coffee powder coming out in the piping 170 that leads to the distribution unit 120.

Additionally, the used capsules 61 may be directed into a removable capsules waste bin 65 that may be removed and emptied by the passengers 900.

According to some embodiments of the invention, the system 100 may be substantially pneumatic to prevent contamination of the piping 170 and 175 as well as to reduce the time it may take the water to boil (since a higher pressure may cause a faster increase of temperature).

According to some embodiments of the invention, the espresso mechanism 10 may further comprise a perforating mechanism or a lid removing mechanism enabling to perforate the espresso capsule 61 or remove the capsules' 61 lid to allow the steamed water to flow through and reach the coffee powder in the capsule 61 hence extracting the coffee beverage.

According to some embodiments of the invention, at least one compressor 190 may be operatively associated to other elements in the transportation unit 50 such as, for example, the tires of the transportation unit 50 to enable converting of the wheels' spinning energy of the air pressure inside the tires to operate the compressor(s) 190.

According to some embodiments of the invention, the compressor 190 may be additionally used for inflating of the tires of the transportation unit 50, for example, in emergency flat-tire cases.

According to some embodiments of the invention, the control panel 140 may be adapted to operate an alarm, which may be, for example, visual, aural and the like. The alarm may provide an indication of, e.g., a failure in the beverage system 100, the completion of preparing the beverage, announcing that the beverage is ready to be served and the like.

According to some embodiments of the invention, the system 100 may be adapted to start a cleaning process, which may clean the beverage system 100 from waste that may have been generated during the operation of the system 100. The cleaning process may start after a predefined time-interval and/or when e.g., one of the passengers 900 provides a corresponding input to the control panel 140. The cleaning process may be activated upon operating first compressor 190 and/or second compressor 190. Additionally or alternatively, beverage system 100 includes one or more pumps that enable performing the cleaning process.

Figure 7:
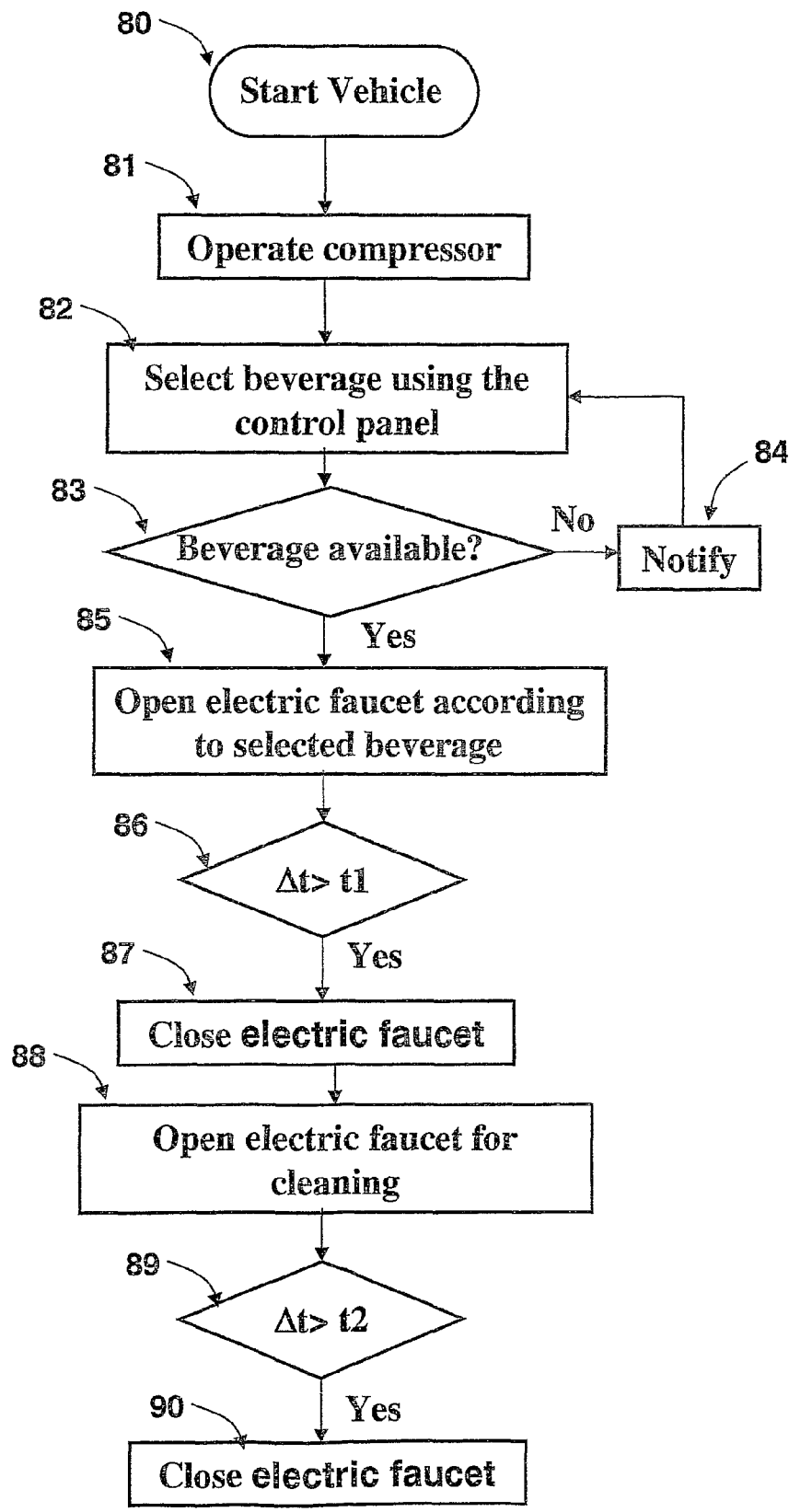
FIG. 7 schematically illustrates a process for distributing of cold beverages in a transportation unit, according to some embodiments of the invention.

FIG. 7 schematically illustrates a method for preparing and distributing of cold beverages, according to some embodiments of the invention, using the beverages system 100. The method may comprise the steps of:
- starting the transportation unit 80 where the system 100 operated by the transportation unit's 50 engine when started (e.g. as the power source 145);
- operating the compressor 81;
- selecting a beverage 82 where the passenger 900 uses options in the control panel 140 interface to select a desirable beverage;
- the system 100 may check whether the selected beverage is available 83 and if not a notification may be presented 84;
- opening of the electric faucet(s) according to the input selections 85—where if the selected beverage is available, the controller 300 may automatically open the cold beverages dispenser(s) 25 that correspond to the selected beverage and the relevant faucets 11 for predefined time intervals 86;
- the electric faucets 11 may be automatically closed 87 once the time interval is completed 86;
- opening the electric faucet 11 for cleaning 88 where the faucet 11 that is directly connected to the water container 20 may automatically open to allow water to run through the beverages piping 170 and thereby clean the piping 170;

According to some embodiments of the invention, the cleaning process may be carried out throughout a predefined time-interval 89 after which the faucet 11 may be closed 90.

Figure 8:
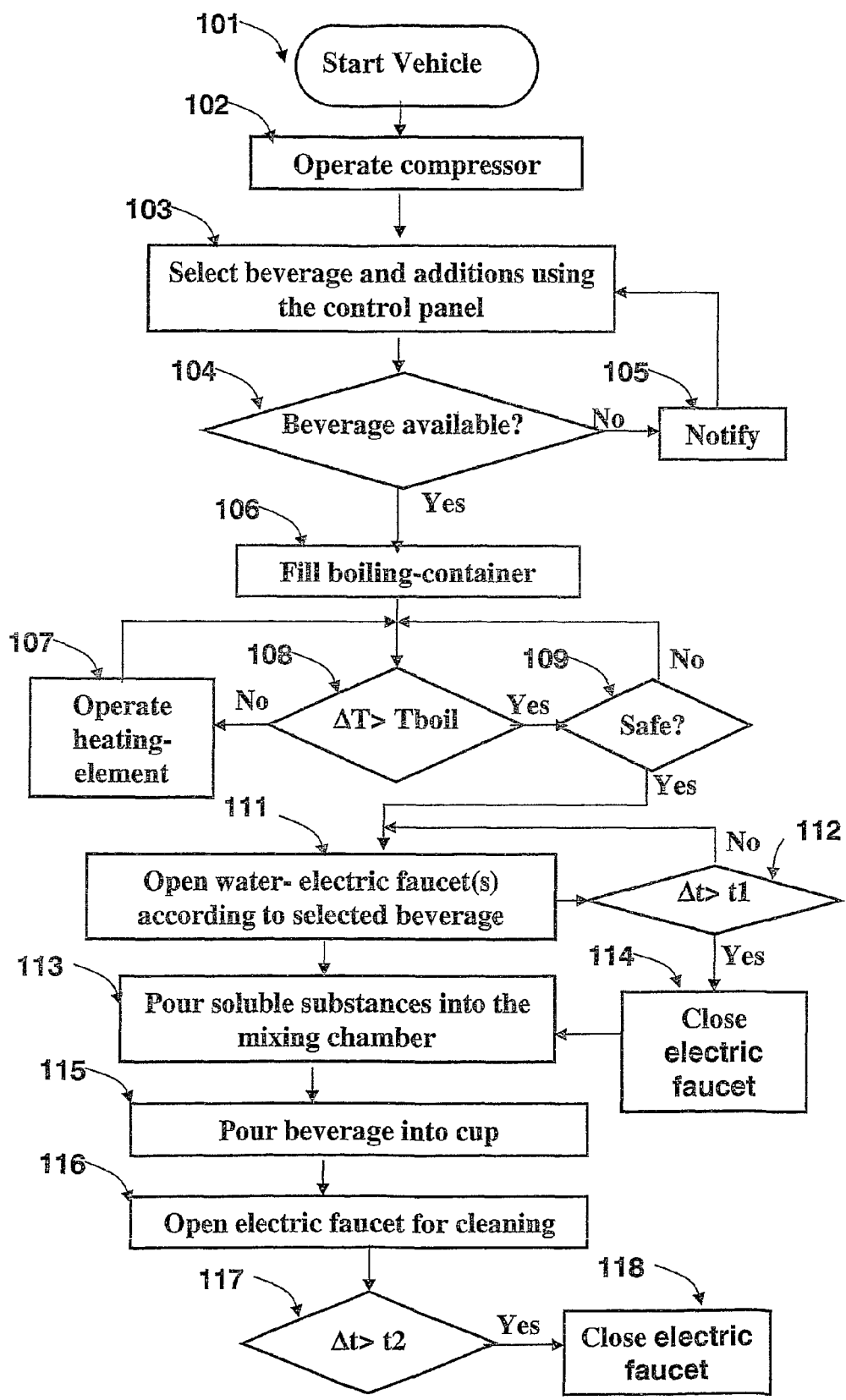
FIG. 8 schematically illustrates a process for distributing of hot beverages in a transportation unit, according to some embodiments of the invention.

FIG. 8 schematically illustrates a method for preparing and distributing of hot beverages, according to some embodiments of the invention, using the beverages system 100. The method may comprise the steps of:
- starting the transportation unit 101 where the system 100 operated by the transportation unit's 50 engine when started (e.g. as the power source 145);
- operating the compressor 102;
- selecting a desirable beverage and its associated additions 103 where the passenger 900 may use options in the control panel 140 interface to select a desirable beverage (e.g. coffee, chocolate milk, tea, espresso and the like) and additions (e.g. sugar, milk, double sugar, and the like);

the system 100 may check whether the selected beverage is available 104 and if not a notification may be presented 105 to the passenger 900 allowing him/her to re-select a beverage and additions;

Filling the boiling container 106 where water from the main container 20 may be moved to fill the boiling container 163 during a predefined time interval;

Once the time-interval is completed 108 a safety mechanism may be executed (e.g. an automated check that verifies there is a cup 200 available that can be filled by the beverage before the faucets are opened allowing the pouring of the beverage) 109;

Operating the heating element 22 of the boiling container 107, which may occur substantially simultaneously to the safety check;

Once the safety check approves proceeding 109, the water electric faucets 11 may be opened 111 during a predefined time-interval 112 after which the faucet 11 of the water is closed 114 enabling to fill the mixing chamber 168 with hot water according to a predefined water quantity;

substantially simultaneously, soluble materials from the dispensers 161 may be transferred and poured to the mixing chamber 113 where the specific materials are automatically selected according to the passenger's 900 selected input beverage and additions;

pouring the beverage that had been stirred at the mixing chamber 168 into the cup 115;

opening the electric faucet 11 for cleaning 116 where the faucet 11 that is directly connected to the water container 20 may automatically open to allow water to run through the beverages piping 170 and thereby clean the piping 170 during a predefined time interval 117 after which the water faucet may be closed 118.

Figure 9:
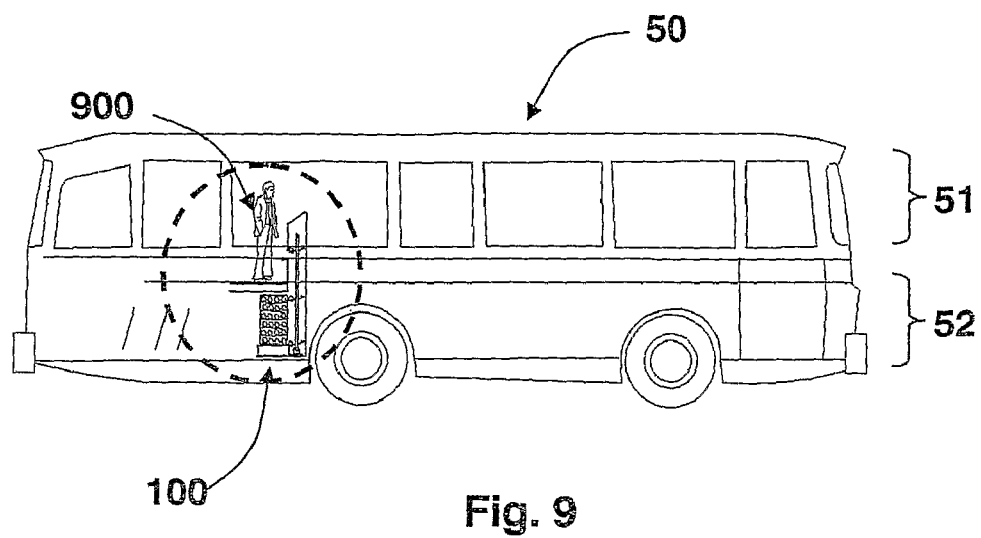
FIG. 9 and FIG. 10 schematically illustrate a beverage system for distributing of drink-containers incorporated in a transportation unit, according to some embodiments of the invention.
Figure 10:
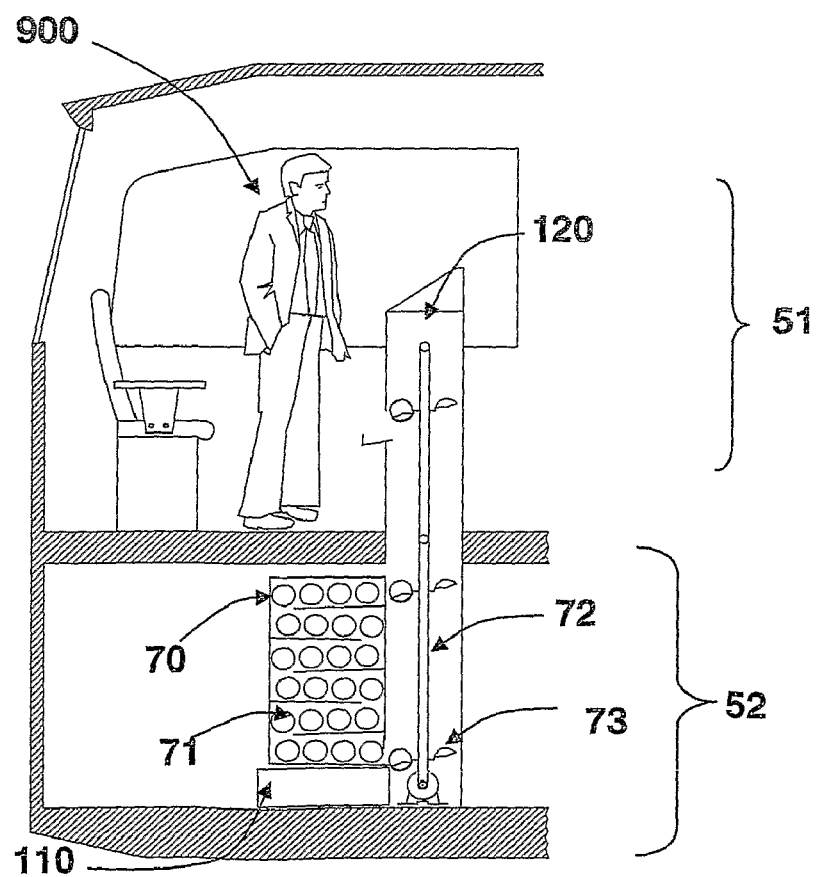

Reference is now made to FIG. 9 and FIG. 10, which schematically illustrate a beverages system 100 implemented in a transportation unit 50 which may be a bus, according to some embodiments of the invention. According to these embodiments, the preparation unit 110 may comprise:

a beverage container 70 seated at the trunk 52 of the bus containing packed beverages 71 (e.g. soft drink cans, drink cartooned packs etc.);

a conveyor 72 comprising a lifting apparatus that enables lifting the packed beverages 71 upon holders 73 enabling to hold the packed beverages 71 while lifted to the distribution unit 120 seated at the passengers cabin 51 area.

According to some embodiments of the invention, the beverages container 70 may be integrated with a refrigerating mechanism to allow cooling of the beverages stored at the container 70.

Figure 11:
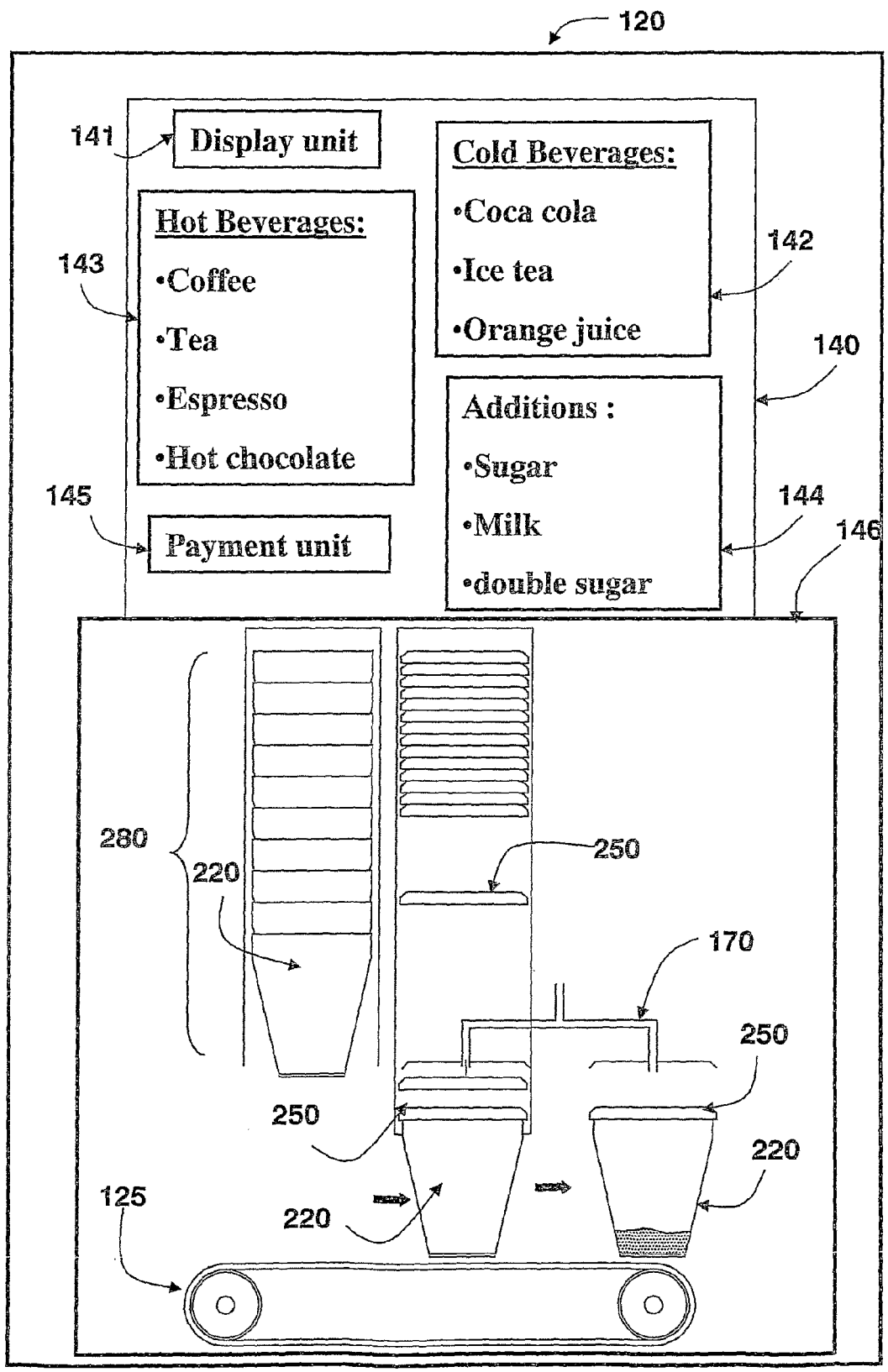
FIG. 11 schematically illustrates a distribution unit, according to some embodiments of the invention.

Reference is now made to FIG. 11, which schematically illustrates a distribution unit 120 according to some embodiments of the invention. According to these embodiments, the distribution unit 120 may comprise:

a control panel 140 comprising:
   a display unit 141 enabling to display messages prices of beverages and the like;
   cold beverages options 142 allowing a passenger 900 to view all available cold beverages and select a desirable cold beverage;
   hot beverages options 143 allowing a passenger 900 to view all available hot beverages and select a desirable hot beverage;
   additions options 144 enabling a passenger 900 to select and view additions to the beverage such as, for example, sugar, milk and the like;
   a payment unit 145 enabling a passenger 900 to pay for the selected beverage according to predefined corresponding prices and payment options available by the panel 140 (e.g. credit card change etc.);
a delivery unit 146 enabling to pour the selected beverage and optional arriving from the preparation unit 110 into cups 220.

According to some embodiments of the invention, the delivery unit 146 may comprise:
   a cups-container 280 enabling to store a multiplicity of cups 220 and to allow a single cup to reach a pouring zone where it may be filled with the selected beverage;
   a moving unit 125, which may be a conveyor, as illustrated in FIG. 11, or a robotic arm, for example, enabling to move the cup from the dispensing cup-container 280 area to an area in which the selected beverage may be poured.

Additionally, a dispensing lid-container 250 enabling to hold a multiplicity of lids 250 adapted to be fastened and cover the cups 220 may be added to the delivery unit 146, where each lid 250 may comprise an opening suitable for receiving of a tube like piping 170 that may be used to insert the selected beverage into the cup 220. The moving unit 125 may enable first moving the cup 220 from the dispensing cup-container 280 area to the area where the cup 200 may be added with a lid 250 that may be fastened to the rim of the cup 220. The moving unit may then move the covered cup 220 to the pouring area where the tip of piping 170 may be threaded through the opening of the lid 250 to insert the beverage.

According to some embodiments of the invention, the control panel 140 and/or the controller 300 may additionally enable visual notifications (e.g. indicating light bulbs), aural notifications (e.g. voice messages) or both, allowing notifying and/or indicating the passenger 900 regarding the availability of beverages, when a beverage is prepared and waiting to be removed from the distribution unit 120 etc.

According to some embodiments of the invention, the system 100 may additionally enable preparation of instant dishes that may be comprised of soluble as well as cook-able materials enabling to become edible once mixed with hot water (e.g. soup, soup and noodles etc.). allowing to dispense the soluble and cook-able materials into a cup 220 or storing of packed boxes of instant dishes and fill the boxes/cups 220 with boiled water arriving from the boiling container 163.

According to some embodiments of the invention, the system 100 may enable inserting said boiled water into said boxes by creating an opening at the box's lid.

According to some embodiments of the invention, the system 100 may be connected to a windowpane mechanism, where said windowpane mechanism may enable directing a portion of heated water from the container to be sprayed upon at least one of the transportation unit's windowpanes to allow cleaning of said windowpane.

The system of claim 20 wherein said connector is removably adapted to connect to a converter that allows connecting said beverages system to other electric power sources.

All parts of the system 100 such as piping 170, 175, faucets 11 and the like may be made from materials that are suitable for carrying edible substances at boiling and chilled temperatures in terms of hygiene, health, resistance and the like.

While the invention has been described with respect to a limited number of embodiments, these should not be construed as limitations on the scope of the invention, but rather as exemplifications of some of the embodiments. Those skilled in the art will envision other possible variations, modifications, and programs that are also within the scope of the invention. Accordingly, the scope of the invention should not be limited by what has thus far been described, but by the appended claims and their legal equivalents. Therefore, it is to be understood that alternatives, modifications, and variations of the present invention are to be construed as being within the scope and spirit of the appended claims.

What is claimed is:

1. A system for preparing and distributing beverages in a vehicle, said system comprising:
    at least one preparation unit enabling to prepare at least one type of beverage, said preparation unit comprises:
        a) at least one water container;
        b) at least one boiling container connected to said water container via piping, said boiling container comprising at least one heating element for heating water arriving from said water container;
        c) at least one mixing chamber connected to said boiling container and/or to said water container via piping; and
        d) at least one dispenser for dispensing at least one type of soluble material therefrom, each said dispenser dispenses said soluble material into said mixing chamber for preparing each beverage by mixing said soluble materials with hot or cold water arriving from said boiling container or said water container, respectively, and
    at least one distribution unit allowing outputting each respective beverage, prepared by said preparation unit, wherein said distribution unit is connected to said preparation unit via piping;
wherein said preparation unit is located in a trunk of said vehicle and said distribution unit is located at a passengers area of said vehicle.

2. The system of claim 1, further comprising a pneumatic system for controlling water flow for preventing pollution of at least part of the piping of said system, said pneumatic system includes at least one air compressor, an air regulator and a multiplicity of pipes, valves and faucets for controlling water flow by controlling air flow therethrough, said pneumatic system allows water to flow out from said water container and/or from said boiler container by introducing compressed air into each respective said container and controlling the flow of water therefrom by controlling the air pressure that is introduced therein, wherein said airflow and thereby water flow are controlled by opening and/or closing the valves and/or faucets.

3. The system of claim 1, wherein said distribution unit comprises:
    a control panel enabling a user to select beverages and control said preparation unit by operating said preparation unit upon an input beverage selection; and
    a delivery unit comprising at least one cup dispenser for dispensing each selected and prepared beverage by pouring the selected beverage into to a cup from said cup dispenser.

4. The system of claim 3, wherein said delivery unit further comprises a dispensing cups-container enabling to store a multiplicity of cups and to allow a single cup to reach a pouring zone where it is filled with the selected beverage; and a moving unit enabling to move the cup from the cup dispenser area to an area in which the selected beverage is poured.

5. The system of claim 4, wherein said moving unit comprises a conveyor.

6. The system of claim 4, wherein said delivery unit further comprises a dispensing lid-container enabling to hold a multiplicity of lids adapted to be fastened and cover said cups, wherein each lid comprises an opening suitable for receiving of a tube like piping used for inserting the selected beverage into said cup therethrough, wherein said moving unit enables first moving the cup from the dispenser area to the area where the cup is added with a lid and then move the covered cup to the pouring area where the tip of the piping is threaded through an opening in the lid to insert the selected beverage.

7. The system of claim 1 wherein said water container also comprises a heating element and a thermostat, wherein the heating element of said water container enables heating of the water contained by said water container to a predefined temperature.

8. The system of claim 1, wherein said mixing chamber comprises a multiplicity of distribution openings enabling spraying hot or cold water arriving from said boiling container or water container, respectively, into said mixing chamber while said soluble materials from a respective dispensers are poured into said mixing chamber, wherein the soluble materials are stirred with said sprayed water due to the pressure caused by said spraying.

9. The system of claim 1 further comprising an espresso mechanism enabling to prepare espresso beverages, which is connected to the preparation unit.

10. The system of claim 9, wherein said espresso mechanism comprises:
    capsules container containing espresso powder capsules;
    capsules tube enabling to direct each new capsule to a bottom part of said capsules tube;
    a capsule-holder installed at the bottom of said capsules tube enabling to hold each espresso capsule, wherein said holder further enables perforating the lid of said capsule;
    a pressure pump enabling to introduce a steam of water, arriving from the boiling container, to the capsule-holder where the steaming water are filtered through the coffee powder of said capsule enabling to extract an espresso beverage thereby.

11. The system of claim 1, further comprising:
    a packed beverages container located at the trunk of the vehicle containing packed beverages;
    a conveyor comprising a lifting apparatus that enables lifting the packed beverages upon holders attached to said conveyor, wherein said holders enable holding each said packed beverage while lifted to the distribution unit seated at the passengers area, located above said trunk.

12. The system of claim 11, wherein said packed beverages container is integrated with a refrigerating mechanism allowing cooling of the beverages stored at said packed beverages container.

13. The system of claim 1, wherein a multiplicity of distribution units are located at the trunk of said vehicle.

14. The system of claim 1, wherein said distribution unit, comprises a thermal cup mechanism, wherein said thermal cup mechanism comprises a cup, a body, and a fastening mechanism including a receiving part and a funnel shaped edge for being held by said receiving part enabling to releasably fasten the body to the cup; wherein said thermal cup mechanism enables flow of beverages from the body and the piping from which the beverage is poured, to the cup only once said body is fastened to said cup and preventing flow of the beverage when said body is removed from said cup.

15. The system of claim 1, wherein said system is operated by using a power source of said vehicle.

16. The system of claim 1, further comprising at least one a timer operatively associated with said dispense, said boiling container and/or said water container, said timer is configured to control the amount of water and/or soluble materials released from each container and/or dispenser for preparing each beverage.

17. The system of claim 1, wherein said system further enables directing a portion of heated water from said boiling container towards at least one windowpane of said vehicle thereby allowing spraying said heated water over said windowpane for cleaning thereof.

* * * * *